United States Patent
Low et al.

(10) Patent No.: US 10,452,599 B2
(45) Date of Patent: Oct. 22, 2019

(54) STATE DETECTION MECHANISM

(71) Applicant: INTEL CORPORATION, Santa Clara, CA (US)

(72) Inventors: Chia How Low, Simpang Amat (MY); Jia Jun Lee, Seberang Jaya (MY); Kevin Beow Ee Tan, Klang (MY); Chee Hong Aw, Klang (MY)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 15/775,255

(22) PCT Filed: Oct. 20, 2016

(86) PCT No.: PCT/US2016/057907
§ 371 (c)(1),
(2) Date: May 10, 2018

(87) PCT Pub. No.: WO2017/112065
PCT Pub. Date: Jun. 29, 2017

(65) Prior Publication Data
US 2018/0373670 A1    Dec. 27, 2018

(30) Foreign Application Priority Data

Dec. 25, 2015    (MY) .................... PI2015704765

(51) Int. Cl.
*G06F 13/42*    (2006.01)
*G06F 13/40*    (2006.01)

(52) U.S. Cl.
CPC ...... *G06F 13/4282* (2013.01); *G06F 13/4068* (2013.01); *G06F 13/4295* (2013.01); *G06F 2213/0042* (2013.01)

(58) Field of Classification Search
CPC ...... G06F 13/38; G06F 13/4068; G06F 13/42; G06F 13/4221; G06F 13/4226; G06F 13/423; G06F 13/4282; G06F 13/4291; G06F 13/4295; G06F 13/4072
See application file for complete search history.

(56) References Cited

U.S. PATENT DOCUMENTS

| | | | |
|---|---|---|---|
| 2014/0003473 A1 | 1/2014 | Chen et al. | |
| 2014/0006652 A1* | 1/2014 | Chen | G06F 11/3051 710/16 |
| 2014/0006653 A1 | 1/2014 | Chen et al. | |
| 2014/0156876 A1 | 6/2014 | Chan et al. | |
| 2015/0227489 A1 | 8/2015 | Chen et al. | |
| 2016/0162427 A1* | 6/2016 | Kang | G06F 13/387 710/313 |

(Continued)

OTHER PUBLICATIONS

"Embedded USB2 (eUSB2) Physical Layer Supplement to the USB Revision 2.0 Specification." Revision 1.0. 2013. Hewlett-Packard Company et al. (Year: 2013).*

(Continued)

*Primary Examiner* — Thomas J Cleary
(74) *Attorney, Agent, or Firm* — Womble Bond Dickinson (US) LLP

(57) ABSTRACT

An Embedded Universal Serial Bus 2.0 (USB2) device includes a physical layer having a detection mechanism to detect an Single-ended 1 (SE1) valid state and differentiate the SE1 valid state from other USB2 states.

25 Claims, 11 Drawing Sheets

(56) References Cited

U.S. PATENT DOCUMENTS

2016/0162430 A1\* 6/2016 Ma .................. G06F 13/385
                                              710/313
2016/0269126 A1\* 9/2016 Maung ................ H04B 10/25
2018/0189222 A1\* 7/2018 Srivastava ........... G06F 13/287

OTHER PUBLICATIONS

"Universal Serial Bus Specification." Revision 2.0. Apr. 27, 2000. Compaq Computer Corporation et al. (Year: 2000).\*
PCT/US2016/057907, International Preliminary Report and Written Opinion, dated Jul. 5, 2018, (10 pages).
Korean IP Office—International Search Report of the International Searching Authority dated Jan. 21, 2017 for International Application No. PCT/US2016/057907 (3 pgs).
Korean IP Office—Written Opinion of the International Searching Authority dated Jan. 21, 2017 for International Application No. PCT/US2016/057907 (8 pgs).

\* cited by examiner

300

US 10,452,599 B2

STATE DETECTION MECHANISM

CROSS-REFERENCE TO RELATED APPLICATIONS

This patent application is a U.S. National Phase application under 35 U.S.C. § 371 of International Application No. PCT/US2016/057907, filed on 20 Oct. 2016, entitled STATE DETECTION MECHAISM, which claims priority to Malaysian Patent Application No. P12015704765, filed 25 Dec. 2015, the contents of which are incorporated by reference in their entirety.

FIELD

The present disclosure generally relates to power management; and more specifically to a low-power solution for Embedded Universal Serial Bus 2.0 (eUSB2).

BACKGROUND

USB is an industry protocol designed to standardize interfaces between computer devices for communication and supplying electrical power. The USB2 protocol has enjoyed widespread adoption in nearly every computing device, and has received tremendous support in terms of technology development with well-established standardized software infrastructure. The standard USB2 specification uses 3.3 Volt analog signaling for communications between two USB2 ports. The 3.3 Volt signal strength tends to introduce integration challenges because some advanced semiconductor processes are moving towards a very low geometry leading to the gate oxide of a CMOS transistor no longer able to tolerate higher voltages, such as 3.3 Volt. In addition, the standard USB2 specification results in relatively high levels of power consumption at both idle and active states. As a result, USB2 may not be suitable for devices that place stringent specifications on I/O power consumption, such as mobile platforms.

DETAILED DESCRIPTION

Embodiments described herein relate to a mechanism that enables an embedded USB2 (eUSB2) protocol to accurately detect and differentiate an SE1 valid state from other potential states. In one embodiment, eUSB2 provides a solution for system on chip (SOC) designs in which a repeater handles high voltage operation during a classical speed mode of operation, and operates as a re-driver during high speed operation. eUSB2 defines a protocol for communication between a physical layer and repeater based on the USB2 operation. The signaling techniques described herein can be used to support the standard USB2 operation at the protocol level. Further, the signaling techniques described herein may use simplified physical layer architecture as compared to the standard USB2 physical layer architecture.

The simplified physical layer architecture disclosed herein may support Low-Speed (LS) operation, Full-Speed (FS) operation, or High-Speed (HS) operation. During High-Speed operation, the link is operated using low-swing differential signaling, for example, 0.2 Volt differential signaling as opposed to 0.4 Volt differential signaling used in standard USB2. During Low-Speed or Full-Speed operation, the simplified PHY architecture enables the use of a fully digital communication scheme. For example, the simplified PHY architecture can use 1 Volt CMOS circuitry, as opposed to the 3.3 Volts CMOS signaling used in standard USB2. In a fully digital communication scheme, the analog components typically used in standard USB2, such as current sources and operational amplifiers are eliminated.

In the following description, numerous specific details are set forth in order to provide a thorough understanding of various embodiments. However, various disclosed embodiments may be practiced without the specific details. In other instances, well-known methods, procedures, components, and circuits have not been described in detail so as not to obscure the particular embodiments of the invention.

Figure 1:
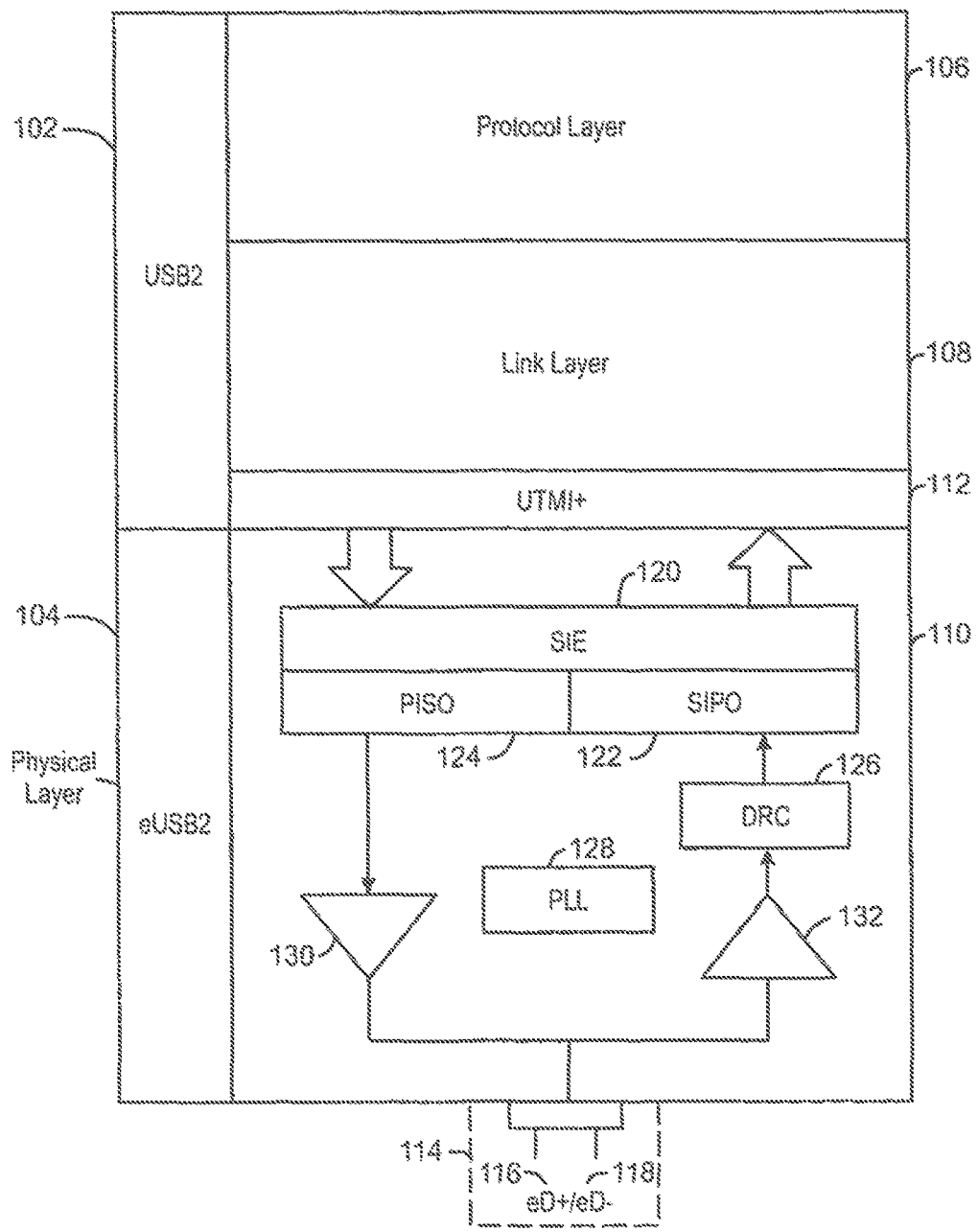
FIG. 1 illustrates one embodiment of an embedded universal serial bus architecture.

FIG. 1 is a block diagram illustrating one embodiment of an embedded universal serial bus architecture. The eUSB2 architecture may be used in any suitable electronic device, including desktop computers, laptop computers, tablets, and mobile phones, among others. The eUSB2 architecture 100 may include a standard USB2 segment 102 and a eUSB2 segment 104 in accordance with embodiments. The standard USB2 segment 102 may include a protocol layer 106 and a link layer 108. The protocol layer 106 is used for managing the transfer of information between a device and a host. For example, the protocol layer 106 is used to determine how to structure information packets. The link layer 108 is used for creating and maintaining a channel of communication (or link) between the device and the host. The link layer 108 also controls the flow of information and power management status of the link. In embodiments, both the protocol layer 106 and the link layer operate in accordance with standard USB2 communication protocols.

The eUSB2 segment 104 contains a physical layer (PHY) 110 unique to the eUSB2 architecture 100. The physical layer 110 may interface with the link layer 108 through any suitable interface 112, such as a USB 2.0 Transceiver Macrocell Interface (UTMI), and UTMI with extensions (UTMI+), among others.

The physical layer 110 may include a pair of eUSB2 data lines 114, referred to herein as eD+ 116 and eD− 118. The data lines are used to transmit signals between an upstream port and a downstream port. Depending on the particular operating mode, the physical layer 110 is configured to transmit data on the data lines 114 using differential signaling, single ended digital communications, or some combination thereof. For example, while operating in high speed, differential signaling may be used to transmit data, while single-ended digital communications may be used to transmit control signals. While operating in low speed or full speed, single-ended digital communications may be used to transmit data and control signals. The functions and behaviors of eD− and eD+ may vary depending on the data rate of the device.

The physical layer 110 may also include a Serial Interface Engine (SIE) 120 for translating USB information packets to be used by the protocol layer 106. The Serial Interface Engine 120 includes a Serial-In, Parallel-Out (SIPO) block 122 for converting incoming serial data received via the signal lines 114 into parallel data for transmitting to the link layer 108. The Serial Interface Engine 120 also includes a Parallel-In, Serial-Out (SIPO) block 122 for converting outgoing parallel data received from the link layer 108 into serial data for transmission onto the signal lines 114. The physical layer 110 can also include a Data Recovery Circuit (DRC) 126 and a Phased Locked Loop (PLL) 128 for recovering data received via the signal lines 114. The physical layer 110 also includes a number of transmitters 130 and receivers 132 for controlling the signals lines 114. For the sake of simplicity, a single transmitter 130 and receiver 132 pair are shown in FIG. 1. However, it will be appreciated that the physical layer 110 can include any suitable number of transmitters 130 and receivers 132 used to implement the various embodiments described herein.

Figure 2:
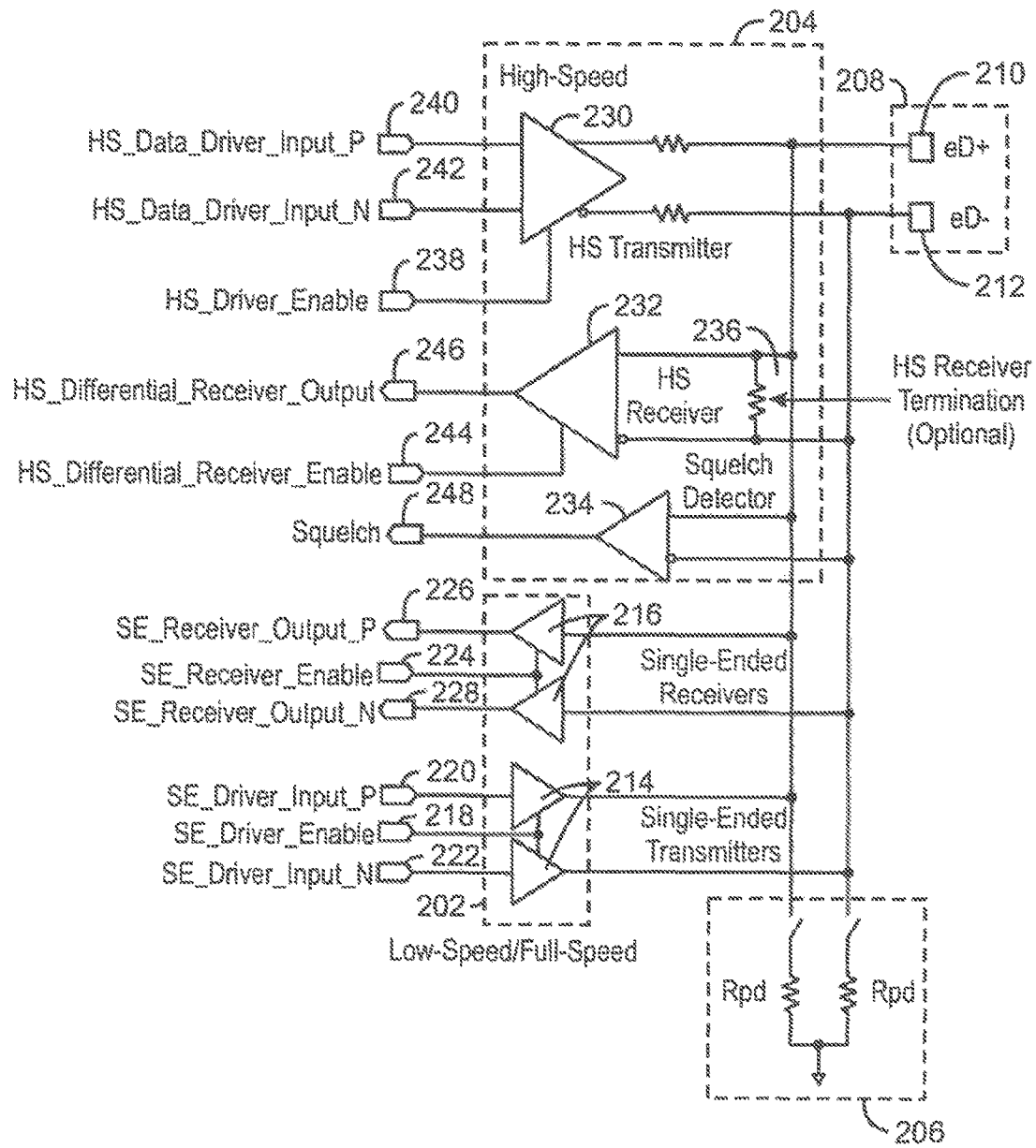
FIG. 2 illustrates one embodiment of an embedded universal serial bus physical layer.

FIG. 2 is a block diagram of a universal serial bus physical layer with High-Speed (HS), Low-Speed (LS), and Full-Speed (FS) capability. In embodiments, the HS, FS, and LS data rates correspond to the data rates specified by the USB2 protocol. For example, during LS operation the PHY may provide a data rate of approximately 1.5 Mbit/s, during FS operation the PHY may provide a data rate of approximately data rate of 12 Mbit/s, and during HS operation, the PHY may provide a data rate of approximately 480 Mbit/s. The eUSB2 PHY 200 can include both a Low-Speed/Full-Speed (LS/FS) transceiver 202 and a High-Speed (HS) transceiver 204. In embodiments, the PHY 200 also includes a pair of pull-down resistors 206 used for device connect detection. The LS/FS transceiver 202 and HS transceiver 204 are communicatively coupled to the eUSB2 signal lines 208, which include eD+ 210 and eD− 212. The HS transceiver 204 and LS/FS transceiver 202 may be configured to selectively take control of the signal lines 208 depending on the data rate capabilities of the upstream device connected to the PHY 200.

The LS/FS transceiver 202 may include a pair of single-ended digital transmitters 214 and a pair of single-ended digital receivers 216. These components act as the input and output, respectively, for single-ended signaling. In single-ended signaling, each of the signal lines eD+ 210 and eD− 212 can transmit separate signal information. This is in contrast to standard USB2 implementation, in which LS/FS operations use differential signaling. In differential signaling, information is transmitted through two complementary signals transmitted on the pair of signal lines eD+ 210 and eD− 212. The translation of the physical signals transmitted over the signal lines 208 into binary signal data may be accomplished using any suitable techniques, such as Non-return-to-zero, inverted (NRZI).

The LS/FS transceiver 202 may be fully digital, meaning that the analog components typically present for USB2 LS/FS circuitry, such as operational amplifiers and current sources, are eliminated. The single-ended digital transmitters 214 and the single-ended digital receivers 216 may be digital CMOS (Complementary Metal-Oxide-Semiconductor) components that operate with a signaling voltage of 1.0 Volts, as compared to the standard 3.3 Volt signaling for USB2. Low-speed/Full-speed idle state (SE0) is maintained by the pull-down resistors 206 implemented at the downstream port. To ensure a swift transition to idle state, the port shall drive the bus to SE0 before disabling its transmitters.

The HS transceiver 204 may be an analog transceiver configured for low swing differential signaling. For example, the HS transceiver may operate with a signaling voltage of 0.2 Volts, as compared to the 0.4 Volts used in USB2, thus a reduced power consumption is achieved during data transmission. The HS transceiver 204 can include a High-Speed transmitter 230 for data transmission, a High-Speed receiver 232 for data reception, and a squelch detector 234 for detection of link status, i.e. HS active, and HS idle. Additionally, in some embodiments, the HS transceiver 204 may also include an HS receiver termination 236 to minimize the signal reflection at the receiver leading to improved signal integrity. During the HS operating mode, wherein the HS transceiver 204 is enabled, the PHY 200 communicates data using differential signaling and can also transmit control signals using single-ended communications.

The HS transceiver 204 and LS/FS transceiver 202 are both controlled by the link layer 108, which interfaces with the PHY 200 through the interface 112. Various data and control lines from the interface 112 are coupled to the transceivers 202 and 204. For example, as shown in FIG. 2, enable signals 218, 224, 244, and 238 are used to selectively enable the LS/FS transmitters 214, the LS/FS receivers 216, the HS receiver 232, or the HS transmitter 230, respectively. Complementary driver inputs 240 and 242 are coupled to the HS transmitter 230 for driving the HS transmitter to output data and/or control signals to the signals lines 208. A receiver output 246 is coupled to the HS receiver 232 for receiving data transmitted to the PHY 200 via the signals lines 208. A squelch detector 248, upon detecting the start of HS data packet, disables the SE receiver 216, enables the HS receiver 232, and optionally the receiver termination 236. Positive and negative receiver outputs 226 and 228 are coupled to the LS/FS receivers 216 for receiving data transmitted to the PHY 200 via the signals lines 208. Positive and negative driver inputs 220 and 222 are coupled to the LS/FS transmitters 214 for driving the LS/FS transmitter to output data and/or control signals to the signals lines 208.

In embodiments, the device port (not shown) will have an eUSB interface with a physical layer substantially similar to the physical layer 200. In such an embodiment, the host and device both use the eUSB protocol. In embodiments, the device port may be a standard USB2 port with a standard USB2 physical layer. In such an embodiment, a repeater may be used to translate the eUSB signals sent from the host to standard USB2 signals. For example, the repeater may be configured to translate signals, such as device connect, device disconnect, data rate negotiation, and the like. The repeater may also be used to recondition the voltages of the eUSB signals to the voltages used in standard USB2.

Figure 3:
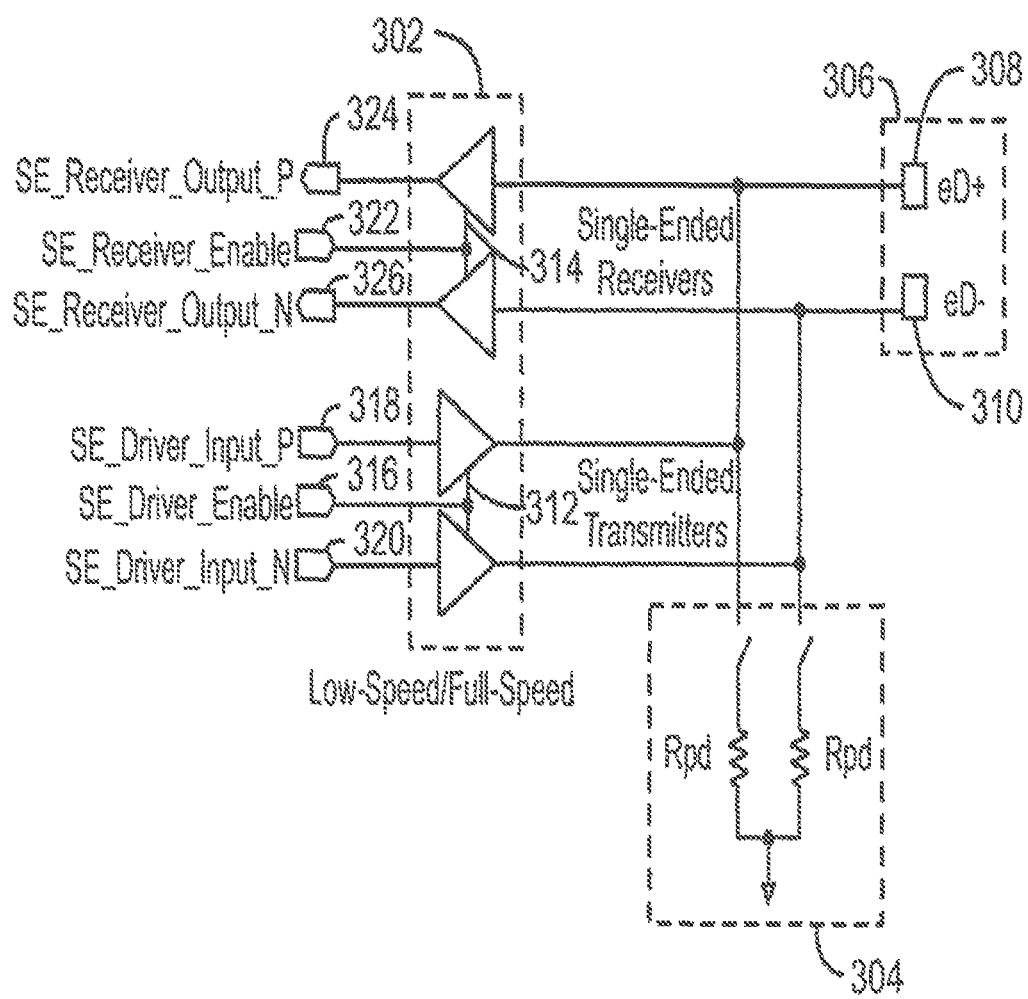
FIG. 3 illustrates another embodiment of an embedded universal serial bus physical layer.

FIG. 3 is a block diagram of a universal serial bus physical layer with Low-Speed or Full-Speed capability. As shown in FIG. 3, the eUSB2 physical layer 300 may include a fully digital single-ended transceiver 302 without also including a High-Speed analog transceiver. It may function similarly to the eUSB PHY 200 shown in FIG. 2, but does not have the capability to operate at High Speed (HS). The LS/FS PHY 300 may include an SE transceiver 302, a set of pull-down resistors 304, and a pair of eUSB2 data lines 306.

Figure 4:
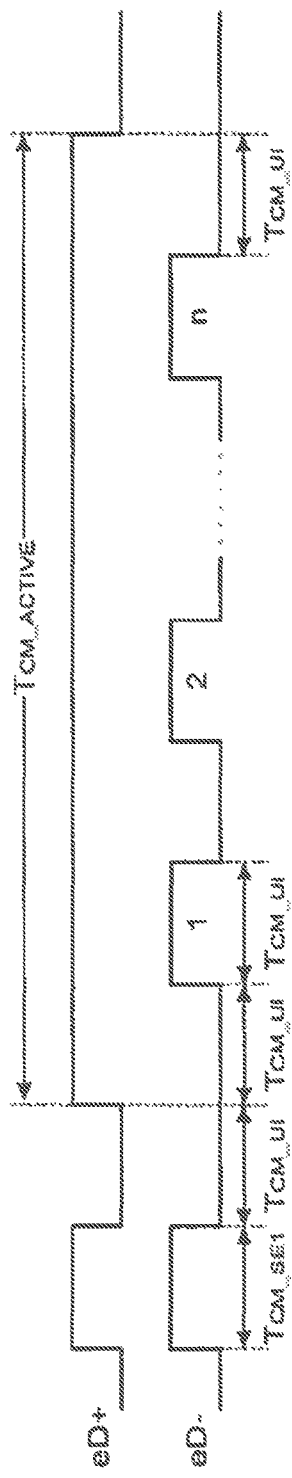
FIG. 4 illustrates one embodiment of eUSB control messages encoding waveform.

According to one embodiment, control messages (CM) are defined for various eUSB2 activity. For instance, control messages indicate a reset, entry to L1/L2 power states, the start of the register access, or disconnect detect enable. Single-ended 1 (SE1) is a valid state implemented in the eUSB2 protocol that begins a CM transmission as a Start of Control Message (SCM). FIG. 4 is a timing diagram illustrating one embodiment of eUSB control messages encoding waveform. In one embodiment, encoding and decoding of a CM is defined based on a number of pulses "n" within an active window ($T_{CM\_ACTIVE}$). For example, n=2 indicates L1 entry, while n=4 indicates L2 entry. In a further embodiment, Minimum $T_{CM\_SE1}$ pulse duration is 0.5 us and 5 us in the L0 and Lx state, respectively.

Figure 5:
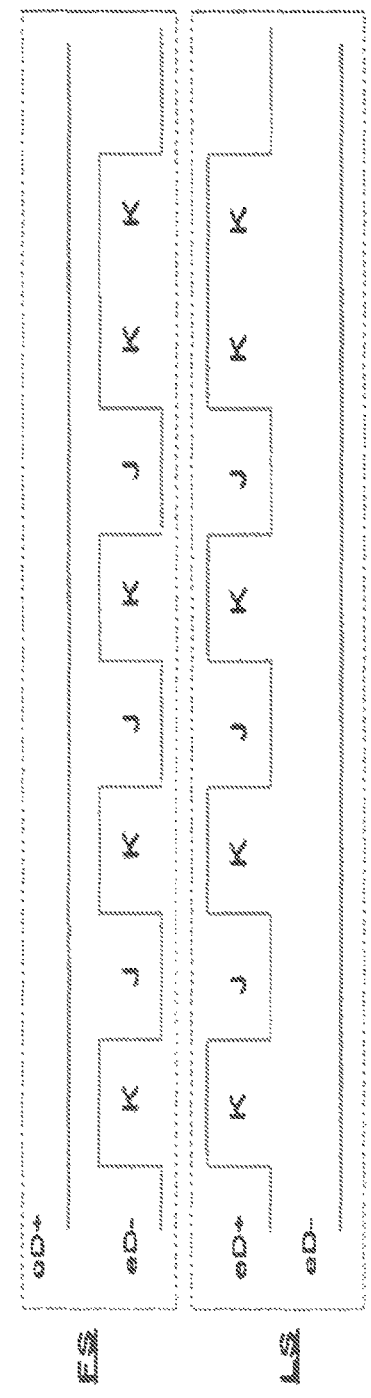
FIG. 5 is a timing diagram illustrating one embodiment of eUSB sync patterns.

FIG. 5 is a timing diagram illustrating one embodiment of eUSB sync patterns of FS and LS wire states during normal operation. The FS sync pattern may be used with the PHY 200 (FIG. 2) and the PHY 300 (FIG. 3) to mark the beginning of a packet sent from one port to another. The sync pattern may use single ended communication, which is suitable for digital CMOS operation. In one embodiment, eUSB2 drives the SYNC pattern on eD− while maintaining logic '0' on eD+ through the pull down resistors 206. Thus, sync is indicated when the data line eD+ is pulled down to logic '0' and during that time the data line eD− transmits a pattern of KJKJKJKK. The LS sync pattern is the opposite (e.g., sync is indicated when the data line eD− is pulled down to logic '0' and during that time the data line eD+ transmits a pattern of KJKJKJKK.

Figure 6:
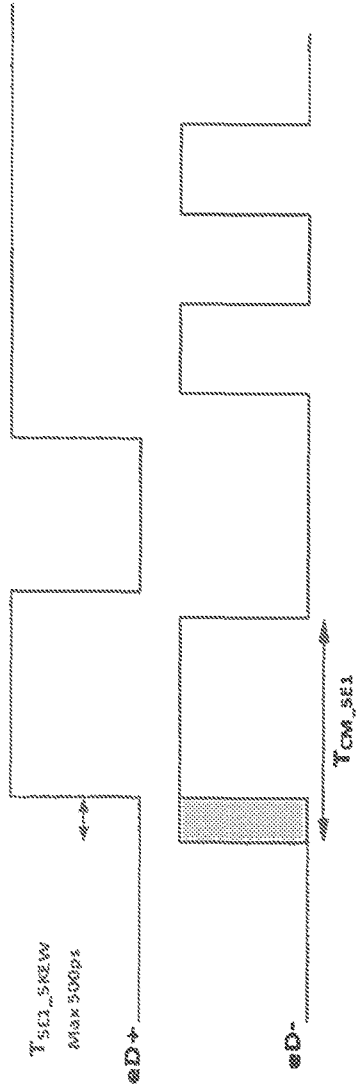
FIG. 6 is a timing diagram illustrating one embodiment of SE1 skew.

According to the eUSB2 protocol, the skew between SE1 at eD+ and eD− is allowed up to maximum of 500 ps. FIG. 6 is a timing diagram illustrating one embodiment of SE1 skew between eD+ and eD−. The physical layer must ensure SE1 skew (highlighted) is not interpreted as a K state, which would trigger the wrong message to a device controller. Moreover, a host/device PHY drives an Extended SE1 (ESE1) on both wires under various circumstances for a port to announce an event such as disconnect or re-connect, or under recovery operation to resolve an unrecognizable eUSB2 bus event. Thus when directed, a port transmits ESE1 regardless of the state of eUSB2.

Figure 7:
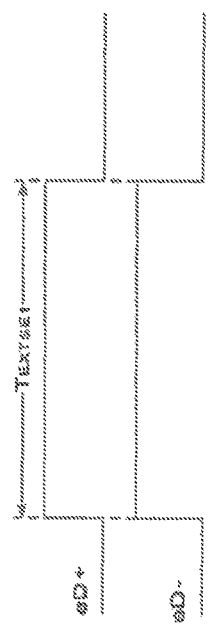
FIG. 7 illustrates one embodiment of an extended SE1 waveform.

FIG. 7 illustrates one embodiment of an ESE1 waveform. As shown in FIG. 7, a $T_{EXTSE1}$ specification is between 30 ms-50 ms. In the eUSB2 protocol a port declares the reception of ESE1 upon detecting SE1 on the eUSB2 bus if the SE1 duration is more than 50 us. Unlike legacy USB2, eUSB2 operates at 1V (or 1.05V) supply domain only. Thus, in order to enable low power mode, power/clock gating is a necessary feature (especially in the Lx suspend state).

Consequently, it is difficult for the eUSB2 PHY to recognize the duration of SE1 in the powerless and clockless state. Further, there may be an inability to detect and differentiate the ESE1 from noise coupling or skew between SE1, which could wrongly be interpreted as resume K state in powerless and clockless Lx suspend state. According to one embodiment, the PHY implements a combination of analog and logic design to accurately detect and differentiate an SE1, in either SCM or ESE1, from other potential states at the wires without corrupting eUSB2 functionality in any of the link states.

Figure 8:
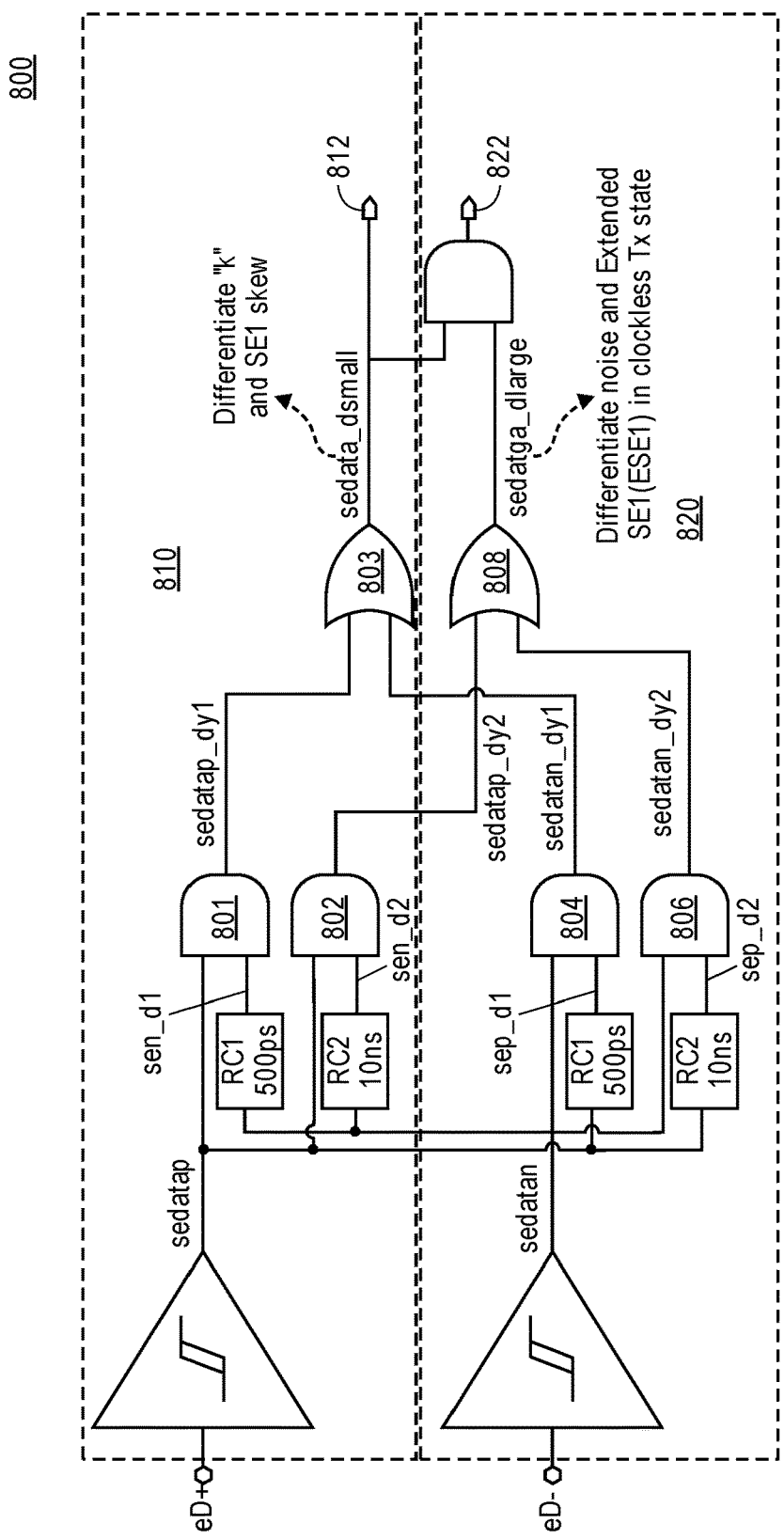
FIG. 8 illustrates one embodiment of a SE1 detection mechanism.

FIG. 8 illustrates one embodiment of detection logic 800. According to one embodiment, detection logic 800 includes an SE1 skew detect component 810 and a ESE1 detect component 820. Component 810 includes a pair of AND-gates (801 and 802) that receives the eD+ signal and a delayed eD− signal and an OR-gate 803. As shown in FIG. 8, the eD− signal received at AND-gate 801 is delayed 500 ps by a first resistor-capacitor (RC1) circuit, while the eD− signal received at AND-gate 802 is delayed 10 ns by a RC2 circuit. In one embodiment, RC1 is designed to meet >500 ps since the maximum skew in eUSB2 is 500 ps. This design enables the physical layer to avoid the SE1 skew being interpreted as a 'K' state and trigger an incorrect message.

An OR-gate 803 that receives the output of AND-gates 801 and 804. According to one embodiment, component 810 is implemented with the presence of a clock and while power is in the L0 power state to identify whether a false SE1 has been triggered by unwanted noise coupling (short pulse), or is an actual SE1 (e.g., SCM or ESE1). In such an embodiment, component 810 generates a signal (SE1_skew_det) at a output 812 that differentiates a 500 ps SE1 skew from "JK" state.

Component 820 also includes a pair of AND-gates (804 and 806) and an OR-gate 808. AND-gates 804 and 806 receive the eD− signal and a delayed eD+ signal. The eD+ signal received at AND-gate 804 is delayed 500 ps by the RC1 circuit, and the eD+ signal received at AND-gate 806 is delayed 10 ns by the RC2 circuit. OR-gate 808 receives the output of AND-gates 802 and 806. Further, component 820 includes an AND-gate 816 that receives the output of both OR-gates 803 and 808.

According to one embodiment, both component 810 and component 820 are implemented in a powerless and clockless Lx state to differentiate whether SE1 is driven by noise coupling or it a real extended SE1 signal. In such an embodiment, a signal (ESE1_det) 822 is generated that filters undesired SE1 noise up to 10 ns or more. Although it is rare to observe noise coupled into both eD+ and eD− and triggered as SE1 for >10 ns. Other embodiments may include variable filtering durations on different RC values and platform noise assumption.

Figure 9:
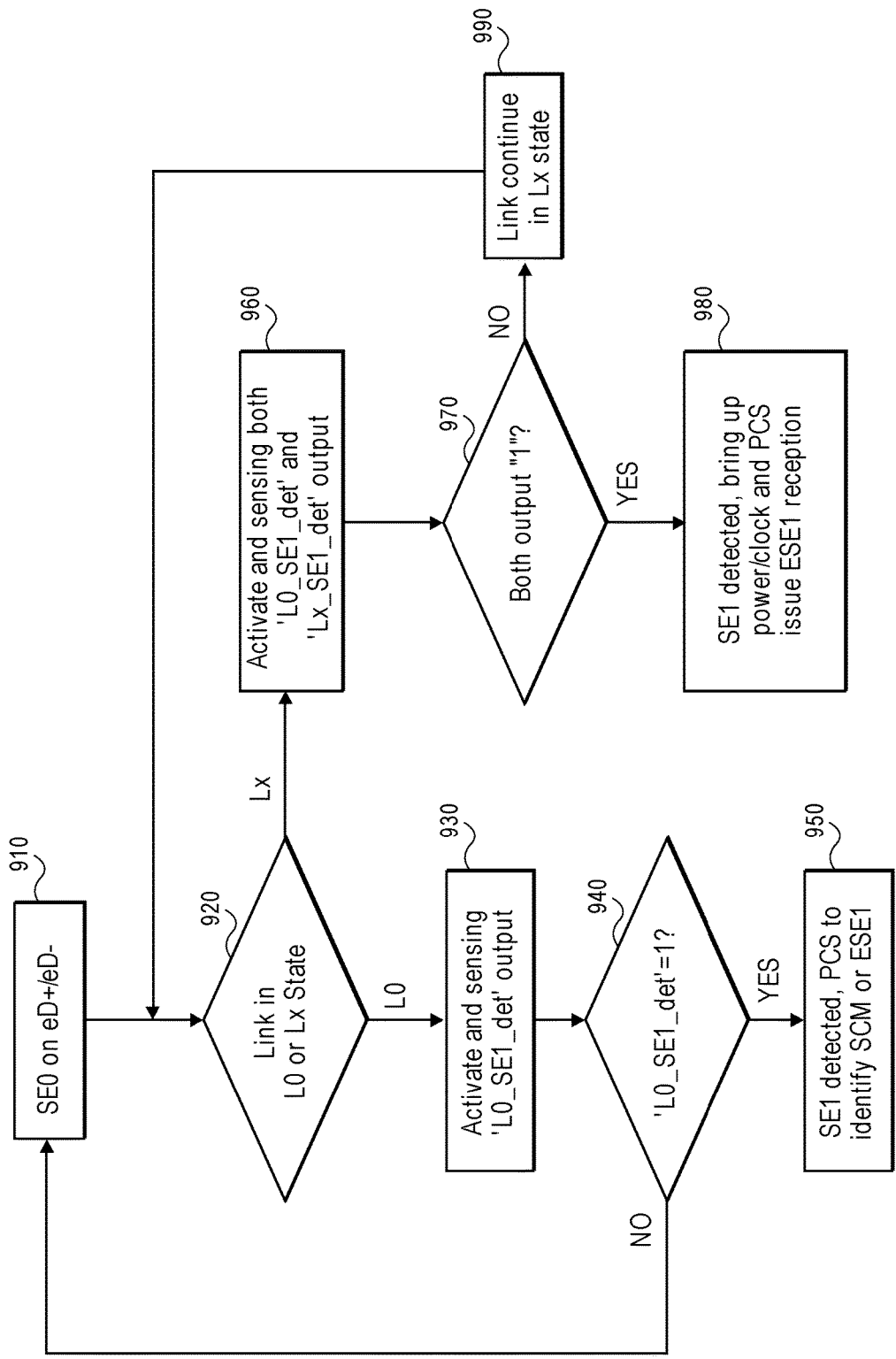
FIG. 9 is a flow diagram illustrating one embodiment of a SE1 detection.

In one embodiment, either a downstream or upstream port waits until the eUSB2 bus state is SE0 before initiating a control message. Similarly, in the Lx suspend state the eUSB2 bus state is in SE0. FIG. 9 is a flow diagram illustrating one embodiment of a SE1 detection in both the L0 and Lx power states. At processing block 910, detection logic 800 detects a SE0 bus state on eD+ and eD−. At decision block 920, a determination is made as to whether the link is operating in the L0 or Lx state. If operating in the L0 state, a L0 SE1 detect (L0_SE1_det) output is activated in order to sense L0_SE1_det. At decision block 940, a determination is made as to whether the L0_SE1_det signal at output 812 is a logical 1. If so, an SE1 bus state is detected, processing block 950. Accordingly, physical layer identifies an SCM or ESE1. Otherwise, control is returned to processing block 910 where operation continues in the SE0 bus state.

If at decision block 920 detection logic 800 detects the Lx state, both the L0_SE1_det output and an Lx SE1 detect (Lx_SE1_det) output is activated, processing block 960. At decision block 970, a determination is made as to whether the both the L0_SE1_det and Lx_SE1_det outputs are a logical 1. If so, the SE1 bus state is detected, processing block 980. Subsequently, the clock system and power supply are activated to receive an ESE1. However if either output is a logical 0, the link continues in the Lx state, processing block 990. Subsequently, control is returned to decision block 920 where a determination is again made as to whether the link is operating in the L0 or Lx state.

Figure 10:
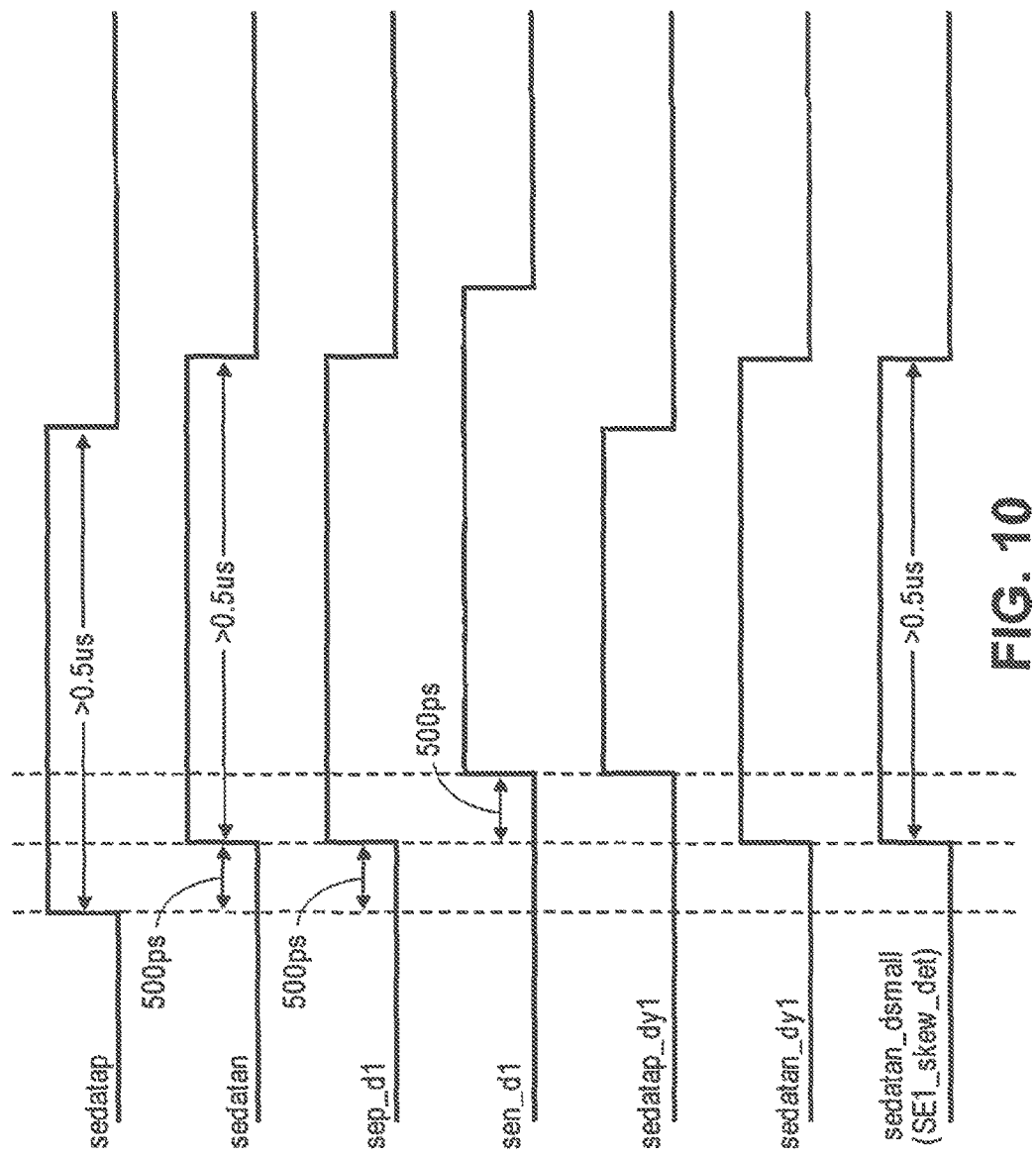
FIG. 10 is a timing diagram illustrating one embodiment of SE1 skew. detection.

FIG. 10 is a timing diagram illustrating one embodiment of SE1 skew. As shown in FIG. 10, detection logic 800 monitors the 'SE1_skew_det' output after both eD+ and eD− wires begin parked at SE0. Upon the output the SE1_skew_det triggering to a logic "1", SE1 is detected and detection logic 800 prepares to receive a CM signal.

Figure 11:
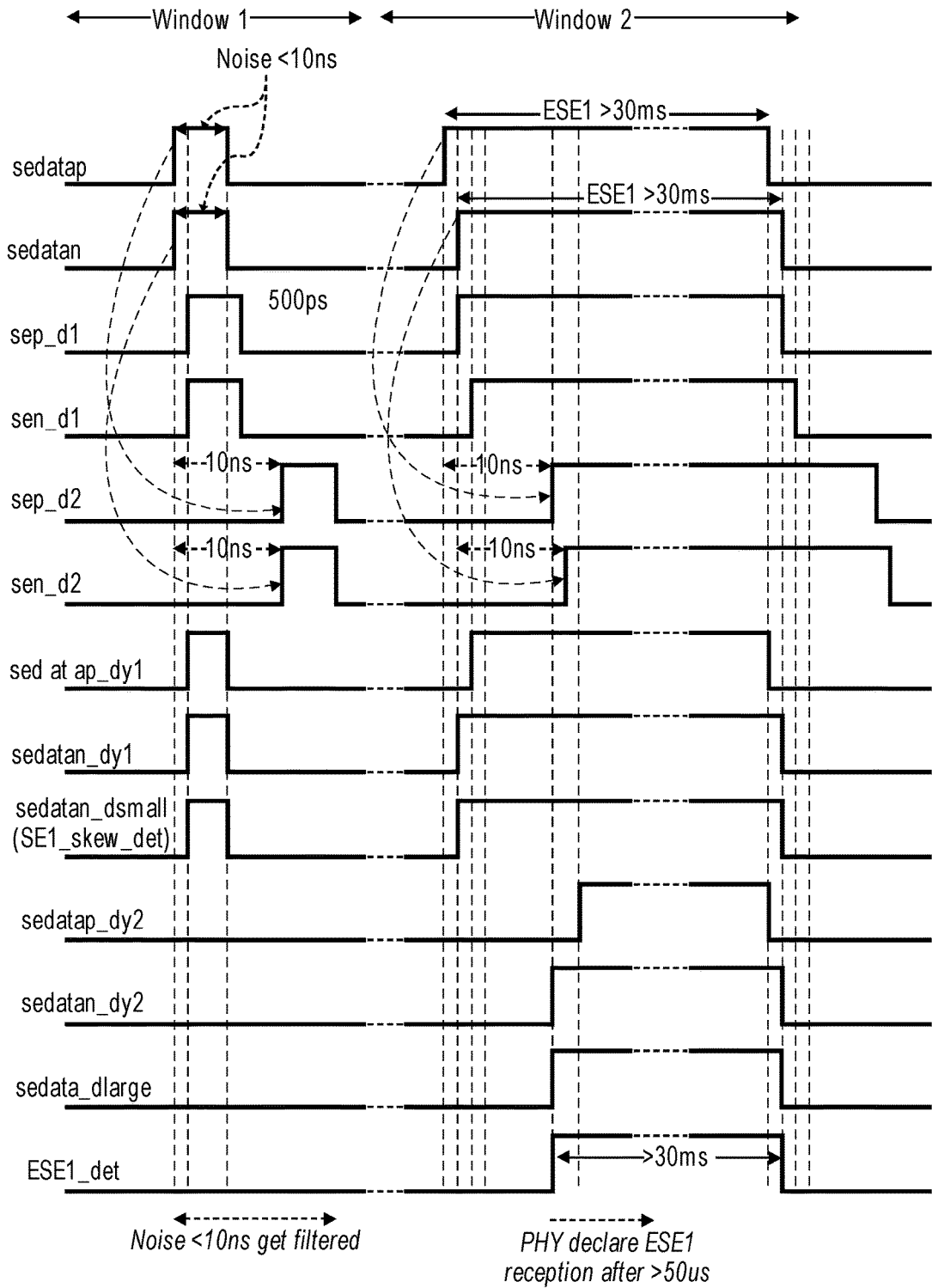
FIG. 11 is a timing diagram illustrating one embodiment of extended SE1 skew detection.

FIG. 11 is a timing diagram illustrating one embodiment of extended SE1 skew detection. As shown in FIG. 11, at the window 1, there is a noise <10 ns found on both eD+ and eD−. In one embodiment, RC2 is designed to filter a noise up to 10 ns (or more). Any noise <10 ns trigger at eD+ or eD− or both wires filters up and is ignored by the physical layer. As long as the physical layer is in the Lx state, detection logic 800 continues to sample the ESE1_det output to identify the ESE1 detection. At window 2, the actual ESE1 signal is coming with the duration greater than the RC2 filter range. The SE1 detected signal will trigger detection logic 800 to bring up the power supply and the clock to prepare for next protocol activity response. There may be a latency of 10 ns for the ESE1 detection. However, the ESE1 duration spec is >30 ms and physical layer 800 would only declare ESE1 detection after 50 us of SE1. This timing duration is sufficient to bring up all necessary power supply and clock system.

Figure 12:
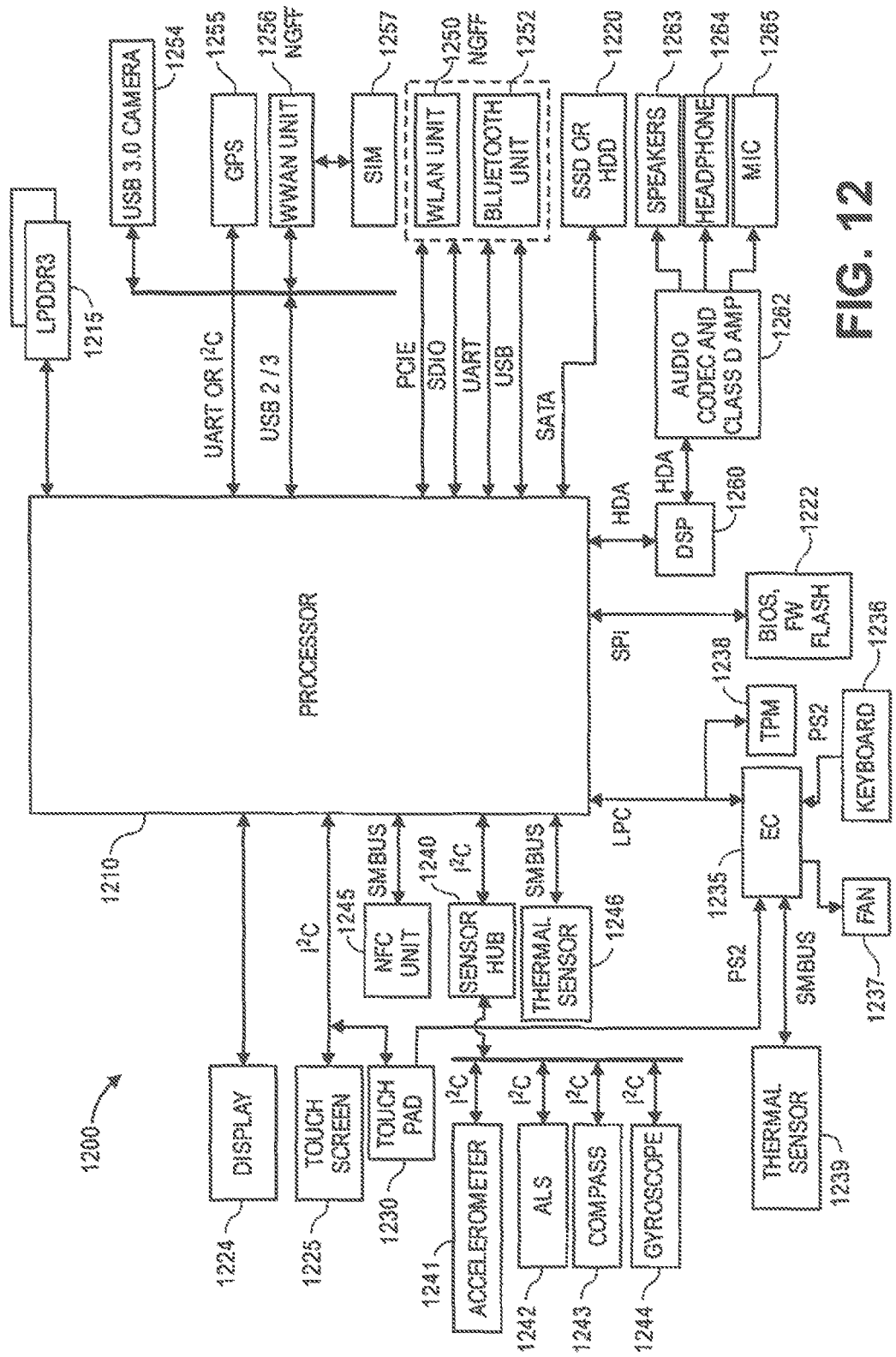
FIG. 12 is a block diagram illustrating one embodiment of a computer system.

FIG. 12 is a block diagram illustrating one embodiment of a computer system in which the above described mechanism may be implemented. As shown in FIG. 12, system 1200 includes any combination of components. These components may be implemented as ICs, portions thereof, discrete electronic devices, or other modules, logic, hardware, software, firmware, or a combination thereof adapted in a computer system, or as components otherwise incorporated within a chassis of the computer system. Note also that the block diagram of FIG. 12 is intended to show a high level view of many components of the computer system. However, it is to be understood that some of the components shown may be omitted, additional components may be present, and different arrangement of the components shown may occur in other implementations. As a result, the disclosure described above may be implemented in any portion of one or more of the interconnects illustrated or described below.

As seen in FIG. 12, a processor 1210, in one embodiment, includes a microprocessor, multi-core processor, multi-threaded processor, an ultra low voltage processor, an embedded processor, or other known processing element. In the illustrated implementation, processor 1210 acts as a main processing unit and central hub for communication with many of the various components of the system 1200. As one example, processor 1200 is implemented as a system on a chip (SoC). As a specific illustrative example, processor 1210 includes an Intel® Architecture Core™-based processor such as an i3, i5, i7 or another such processor available from Intel Corporation, Santa Clara, Calif. However, other low power processors such as those available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters may instead be present in other embodiments such as an Apple A5/A6 processor, a Qualcomm Snapdragon processor, or Ti OMAP processor. Note that many of the customer versions of such processors are modified and varied; however, they may support or recognize a specific instructions set that performs defined algorithms as set forth by the processor licensor. Here, the microarchitecture implementation may vary, but the architectural function of the processor is usually consistent. Certain details regarding the architecture and operation of processor 1210 in one implementation will be discussed further below to provide an illustrative example.

Processor 1210, in one embodiment, communicates with a system memory 1215. As an illustrative example, which in an embodiment can be implemented via multiple memory devices to provide for a given amount of system memory. As examples, the memory can be in accordance with a Joint Electron Devices Engineering Council (JEDEC) low power double data rate (LPDDR)-based design such as the current LPDDR2 standard according to JEDEC JESD 209-2E (published April 13009), or a next generation LPDDR standard to be referred to as LPDDR3 or LPDDR4 that will offer extensions to LPDDR2 to increase bandwidth. In various implementations the individual memory devices may be of different package types such as single die package (SDP), dual die package (DDP) or quad die package (Q17P). These devices, in some embodiments, are directly soldered onto a motherboard to provide a lower profile solution, while in other embodiments the devices are configured as one or more memory modules that in turn couple to the motherboard by a given connector. Other embodiments may feature other memory Implementations, such as other types of memory modules, e.g., dual inline memory modules (DIMMs) of different varieties including but not limited to microDIMMs, MiniDIMMs. In a particular illustrative embodiment, memory is sized between 2 GB and 16 GB, and may be configured as a DDR3LM package or an LPDDR2 or LPDDR3 memory that is soldered onto a motherboard via a ball grid array (BGA).

To provide for persistent storage of information such as data, applications, one or more operating systems and so forth, a mass storage 1220 may also couple to processor 1210. In various embodiments, to enable a thinner and lighter system design as well as to improve system responsiveness, this mass storage may be implemented via a SSD. However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also shown in FIG. 12, a flash device 122 may be coupled to processor 1210, e.g., via a serial peripheral interface (SPI). This flash device may provide for non-volatile storage of system software, including a basic input/output software (BIOS) as well as other firmware of the system.

In various embodiments, mass storage of the system is implemented by a SSD alone or as a disk, optical or other drive with an SSD cache. In some embodiments, the mass storage is implemented as a SSD or as a HDD along with a restore (RST) cache module. In various implementations, the HDD provides for storage of between 320 GB-4 terabytes (TB) and upward while the RST cache is implemented with a SSD having a capacity of 24 GB-256 GB. Note that such SSD cache may be configured as a single level cache (SLC) or multi-level cache (MLC) option to provide an appropriate level of responsiveness. In a SSD-only option, the module may be accommodated in various locations such as in a mSATA or NGFF slot. As an example, an SSD has a capacity ranging from 120 GB-1 TB.

Various input/output (IO) devices may be present within system 1200. Specifically shown in the embodiment of FIG.

12 is a display 1224 which may be a high definition LCD or LED panel configured within a lid portion of the chassis. This display panel may also provide for a touch screen 1225, e.g., adapted externally over the display panel such that via a user's interaction with this touch screen, user inputs can be provided to the system to enable desired operations, e.g., with regard to the display of information, accessing of information and so forth. In one embodiment, display 1224 may be coupled to processor 1210 via a display interconnect that can be implemented as a high performance graphics interconnect. Touch screen 1225 may be coupled to processor 1210 via another interconnect, which in an embodiment can be an I2C interconnect. As further shown in FIG. 12, in addition to touch screen 1225, user input by way of touch can also occur via a touch pad 1230 which may be configured within the chassis and may also be coupled to the same I2C interconnect as touch screen 1225.

The display panel may operate in multiple modes. In a first mode, the display panel can be arranged in a transparent state in which the display panel is transparent to visible light. In various embodiments, the majority of the display panel may be a display except for a bezel around the periphery. When the system is operated in a notebook mode and the display panel is operated in a transparent state, a user may view information that is presented on the display panel while also being able to view objects behind the display. In addition, information displayed on the display panel may be viewed by a user positioned behind the display. Or the operating state of the display panel can be an opaque state in which visible light does not transmit through the display panel.

In a tablet mode the system is folded shut such that the back display surface of the display panel comes to rest in a position such that it faces outwardly towards a user, when the bottom surface of the base panel is rested on a surface or held by the user. In the tablet mode of operation, the back display surface performs the role of a display and user interface, as this surface may have touch screen functionality and may perform other known functions of a conventional touch screen device, such as a tablet device. To this end, the display panel may include a transparency adjusting layer that is disposed between a touch screen layer and a front display surface. In some embodiments the transparency-adjusting layer may be an electrochromic layer (EC), a LCD layer, or a combination of EC and LCD layers.

In various embodiments, the display can be of different sizes, e.g., an 11.6" or a 13.3" screen, and may have a 16:9 aspect ratio, and at least 300 nits brightness. Also the display may be of full high definition (HD) resolution (at least 1920×1080 p), be compatible with an embedded display port (eDP), and be a low power panel with panel self refresh.

As to touch screen capabilities, the system may provide for a display multitouch panel that is multi-touch capacitive and being at least 5 finger capable. And in some embodiments, the display may be 10 finger capable. In one embodiment, the touch screen is accommodated within a damage and scratch resistant glass and coating (e.g., Gorilla Glass™ or Gorilla Glass 2™) for low friction to reduce "finger burn" and avoid "finger skipping". To provide for an enhanced touch experience and responsiveness, the touch panel, in some implementations, has multi-touch functionality, such as less than 2 frames (30 Hz) per static view during pinch zoom, and single-touch functionality of less than 1 cm per frame (30 Hz) with 1300 ms (lag on finger to pointer). The display, in some implementations, supports edge-to-edge glass with a minimal screen bezel that is also flush with the panel surface, and limited IO interference when using multi touch.

For perceptual computing and other purposes, various sensors may be present within the system and may be coupled to processor 1210 in different manners. Certain inertial and environmental sensors may couple to processor 1210 through a sensor hub 1240, e.g., via an I2C interconnect. In the embodiment shown in FIG. 12, these sensors may include an accelerometer 1241, an ambient light sensor (ALS) 142, a compass 1243 and a gyroscope 1244. Other environmental sensors may include one or more thermal sensors 1246 which in some embodiments couple to processor 1210 via a system management bus (SMBus) bus.

Using the various inertial and environmental sensors present in a platform, many different use cases may be realized. These use cases enable advanced computing operations including perceptual computing and also allow for enhancements with regard to power management/battery life, security, and system responsiveness.

For example with regard to power management/battery life issues, based at least on part on information from an ambient light sensor, the ambient light conditions in a location of the platform are determined and intensity of the display controlled accordingly. Thus, power consumed in operating the display is reduced in certain light conditions.

As to security operations, based on context information obtained from the sensors such as location information, it may be determined whether a user is allowed to access certain secure documents. For example, a user may be permitted to access such documents at a work place or a home location. However, the user is prevented from accessing such documents when the platform is present at a public location. This determination, in one embodiment, is based on location information, e.g., determined via a GPS sensor or camera recognition of landmarks. Other security operations may include providing for pairing of devices within a close range of each other, e.g., a portable platform as described herein and a user's desktop computer, mobile telephone or so forth. Certain sharing, in some implementations, are realized via near field communication when these devices are so paired. However, when the devices exceed a certain range, such sharing may be disabled. Furthermore, when pairing a platform as described herein and a smartphone, an alarm may be configured to be triggered when the devices move more than a predetermined distance from each other, when in a public location. In contrast, when these paired devices are in a safe location, e.g., a work place or home location, the devices may exceed this predetermined limit without triggering such alarm.

Responsiveness may also be enhanced using the sensor information. For example, even when a platform is in a low power state, the sensors may still be enabled to run at a relatively low frequency. Accordingly, any changes in a location of the platform, e.g., as determined by inertial sensors, GPS sensor, or so forth is determined. If no such changes have been registered, a faster connection to a previous wireless hub such as a Wi-Fi™ access point or similar wireless enabler occurs, as there is no need to scan for available wireless network resources in this case. Thus, a greater level of responsiveness when waking from a low power state is achieved.

It is to be understood that many other use cases may be enabled using sensor information obtained via the integrated sensors within a platform as described herein, and the above examples are only for purposes of illustration. Using a system as described herein, a perceptual computing system may allow for the addition of alternative input modalities, including gesture recognition, and enable the system to sense user operations and intent.

In some embodiments one or more infrared or other heat sensing elements, or any other element for sensing the presence or movement of a user may be present. Such sensing elements may include multiple different elements working together, working in sequence, or both. For example, sensing elements include elements that provide initial sensing, such as light or sound projection, followed by sensing for gesture detection by, for example, an ultrasonic time of flight camera or a patterned light camera.

Also in some embodiments, the system includes a light generator to produce an illuminated line. In some embodiments, this line provides a visual cue regarding a virtual boundary, namely an imaginary or virtual location in space, where action of the user to pass or break through the virtual boundary or plane is interpreted as an intent to engage with the computing system. In some embodiments, the illuminated line may change colors as the computing system transitions into different states with regard to the user. The illuminated line may be used to provide a visual cue for the user of a virtual boundary in space, and may be used by the system to determine transitions in state of the computer with regard to the user, including determining when the user wishes to engage with the computer.

In some embodiments, the computer senses user position and operates to interpret the movement of a hand of the user through the virtual boundary as a gesture indicating an intention of the user to engage with the computer. In some embodiments, upon the user passing through the virtual line or plane the light generated by the light generator may change, thereby providing visual feedback to the user that the user has entered an area for providing gestures to provide input to the computer.

Display screens may provide visual indications of transitions of state of the computing system with regard to a user. In some embodiments, a first screen is provided in a first state in which the presence of a user is sensed by the system, such as through use of one or more of the sensing elements.

In some implementations, the system acts to sense user identity, such as by facial recognition. Here, transition to a second screen may be provided in a second state, in which the computing system has recognized the user identity, where this second the screen provides visual feedback to the user that the user has transitioned into a new state. Transition to a third screen may occur in a third state in which the user has confirmed recognition of the user.

In some embodiments, the computing system may use a transition mechanism to determine a location of a virtual boundary for a user, where the location of the virtual boundary may vary with user and context. The computing system may generate a light, such as an illuminated line, to indicate the virtual boundary for engaging with the system. In some embodiments, the computing system may be in a waiting state, and the light may be produced in a first color. The computing system may detect whether the user has reached past the virtual boundary, such as by sensing the presence and movement of the user using sensing elements.

In some embodiments, if the user has been detected as having crossed the virtual boundary (such as the hands of the user being closer to the computing system than the virtual boundary line), the computing system may transition to a state for receiving gesture inputs from the user, where a mechanism to indicate the transition may include the light indicating the virtual boundary changing to a second color.

In some embodiments, the computing system may then determine whether gesture movement is detected. If gesture movement is detected, the computing system may proceed with a gesture recognition process, which may include the use of data from a gesture data library, which may reside in memory in the computing device or may be otherwise accessed by the computing device.

If a gesture of the user is recognized, the computing system may perform a function in response to the input, and return to receive additional gestures if the user is within the virtual boundary. In some embodiments, if the gesture is not recognized, the computing system may transition into an error state, where a mechanism to indicate the error state may include the light indicating the virtual boundary changing to a third color, with the system returning to receive additional gestures if the user is within the virtual boundary for engaging with the computing system.

As mentioned above, in other embodiments the system can be configured as a convertible tablet system that can be used in at least two different modes, a tablet mode and a notebook mode. The convertible system may have two panels, namely a display panel and a base panel such that in the tablet mode the two panels are disposed in a stack on top of one another. In the tablet mode, the display panel faces outwardly and may provide touch screen functionality as found in conventional tablets. In the notebook mode, the two panels may be arranged in an open clamshell configuration.

In various embodiments, the accelerometer may be a 3-axis accelerometer having data rates of at least 50 Hz. A gyroscope may also be included, which can be a 3-axis gyroscope. In addition, an e-compass/magnetometer may be present. Also, one or more proximity sensors may be provided (e.g., for lid open to sense when a person is in proximity (or not) to the system and adjust power/performance to extend battery life). For some OS's Sensor Fusion capability including the accelerometer, gyroscope, and compass may provide enhanced features. In addition, via a sensor hub having a real-time clock (RTC), a wake from sensors mechanism may be realized to receive sensor input when a remainder of the system is in a low power state.

In some embodiments, an internal lid/display open switch or sensor to indicate when the lid is closed/open, and can be used to place the system into Connected Standby or automatically wake from Connected Standby state. Other system sensors can include ACPI sensors for internal processor, memory, and skin temperature monitoring to enable changes to processor and system operating states based on sensed parameters.

In an embodiment, the OS may be a Microsoft® Windows® 8 OS that implements Connected Standby (also referred to herein as Win8 CS). Windows 8 Connected Standby or another OS having a similar state can provide, via a platform as described herein, very low ultra idle power to enable applications to remain connected, e.g., to a cloud-based location, at very low power consumption. The platform can supports 3 power states, namely screen on (normal); Connected Standby (as a default "off" state); and shutdown (zero watts of power consumption). Thus in the Connected Standby state, the platform is logically on (at minimal power levels) even though the screen is off. In such a platform, power management can be made to be transparent to applications and maintain constant connectivity, in part due to offload technology to enable the lowest powered component to perform an operation.

Also seen in FIG. 12, various peripheral devices may couple to processor 1210 via a low pin count (LPC) interconnect. In the embodiment shown, various components can be coupled through an embedded controller 1235. Such components can include a keyboard 1236 (e.g., coupled via a PS2 interface), a fan 1237, and a thermal sensor 1239. In some embodiments, touch pad 1230 may also couple to EC 1235 via a PS2 interface. In addition, a security processor such as a trusted platform module (TPM) 1238 in accordance with the Trusted Computing Group (TCG) TPM Specification Version 1.2, dated Oct. 2, 13003, may also couple to processor 1210 via this LPC interconnect. However, understand the scope of the present disclosure is not limited in this regard and secure processing and storage of secure information may be in another protected location such as a static random access memory (SRAM) in a security coprocessor, or as encrypted data blobs that are only decrypted when protected by a secure enclave (SE) processor mode.

In a particular implementation, peripheral ports may include a high definition media interface (HDMI) connector (which can be of different form factors such as full size, mini or micro); one or more USB ports, such as full-size external ports in accordance with the Universal Serial Bus (USB) Revision 3.0 Specification (November 13008), with at least one powered for charging of USB devices (such as smartphones) when the system is in Connected Standby state and is plugged into AC wall power. In addition, one or more Thunderbolt™ ports can be provided. Other ports may include an externally accessible card reader such as a full size SD-XC card reader and/or a SIM card reader for WWAN (e.g., an 8 pin card reader). For audio, a 3.5 mm jack with stereo sound and microphone capability (e.g., combination functionality) can be present, with support for jack detection (e.g., headphone only support using microphone in the lid or headphone with microphone in cable). In some embodiments, this jack can be re-taskable between stereo headphone and stereo microphone input. Also, a power jack can be provided for coupling to an AC brick.

System 1200 can communicate with external devices in a variety of manners, including wirelessly. In the embodiment shown in FIG. 12, various wireless modules, each of which can correspond to a radio configured for a particular wireless communication protocol, are present. One manner for wireless communication in a short range such as a near field may be via a near field communication (NFC) unit 1245 which may communicate, in one embodiment with processor 1210 via an SMBus. Note that via this NFC unit 1245, devices in close proximity to each other can communicate. For example, a user can enable system 1200 to communicate with another (e.g.,) portable device such as a smartphone of the user via adapting the two devices together in close relation and enabling transfer of information such as identification information payment information, data such as image data or so forth. Wireless power transfer may also be performed using a NFC system.

Using the NFC unit described herein, users can bump devices side-to-side and place devices side-by-side for near field coupling functions (such as near field communication and wireless power transfer (WPT)) by leveraging the coupling between coils of one or more of such devices. More specifically, embodiments provide devices with strategically shaped, and placed, ferrite materials, to provide for better coupling of the coils. Each coil has an inductance associated with it, which can be chosen in conjunction with the resistive, capacitive, and other features of the system to enable a common resonant frequency for the system.

As further seen in FIG. 12, additional wireless units can include other short range wireless engines including a WLAN unit 1250 and a Bluetooth unit 1252. Using WLAN unit 1250, Wi-Fi™ communications in accordance with a given Institute of Electrical and Electronics Engineers (IEEE) 802.11 standard can be realized, while via Bluetooth unit 1252, short range communications via a Bluetooth protocol can occur. These units may communicate with processor 1210 via, e.g., a USB link or a universal asynchronous receiver transmitter (UART) link. Or these units may couple to processor 1210 via an interconnect according to a Peripheral Component Interconnect Express™ (PCIe™) protocol, e.g., in accordance with the PCI Express™ Specification Base Specification version 3.0 (published Jan. 17, 13007), or another such protocol such as a serial data input/output (SDIO) standard. Of course, the actual physical connection between these peripheral devices, which may be configured on one or more add-in cards, can be by way of the NGFF connectors adapted to a motherboard.

In addition, wireless wide area communications, e.g., according to a cellular or other wireless wide area protocol, can occur via a WWAN unit 1256 which in turn may couple to a subscriber identity module (SIM) 1257. In addition, to enable receipt and use of location information, a GPS module 1255 may also be present. Note that in the embodiment shown in FIG. 12, WWAN unit 1256 and an integrated capture device such as a camera module 1254 may communicate via a given USB protocol such as a USB 2.0 or 3.0 link, or a UART or I2C protocol. Again the actual physical connection of these units can be via adaptation of a NGFF add-in card to an NGFF connector configured on the motherboard.

In a particular embodiment, wireless functionality can be provided modularly, e.g., with a WiFi™ 802.11ac solution (e.g., add-in card that is backward compatible with IEEE 802.11abgn) with support for Windows 8 CS. This card can be configured in an internal slot (e.g., via an NGFF adapter). An additional module may provide for Bluetooth capability (e.g., Bluetooth 4.0 with backwards compatibility) as well as Intel® Wireless Display functionality. In addition NFC support may be provided via a separate device or multifunction device, and can be positioned as an example, in a front right portion of the chassis for easy access. A still additional module may be a WWAN device that can provide support for 3G/4G/LTE and GPS. This module can be implemented in an internal (e.g., NGFF) slot. Integrated antenna support can be provided for WiFi™, Bluetooth, WWAN, NFC and GPS, enabling seamless transition from WiFi™ to WWAN radios, wireless gigabit (WiGig) in accordance with the Wireless Gigabit Specification (July 2010), and vice versa.

As described above, an integrated camera can be incorporated in the lid. As one example, this camera can be a high resolution camera, e.g., having a resolution of at least 2.0 megapixels (MP) and extending to 6.0 MP and beyond.

To provide for audio inputs and outputs, an audio processor can be implemented via a digital signal processor (DSP) 1260, which may couple to processor 1210 via a high definition audio (HDA) link. Similarly, DSP 1260 may communicate with an integrated coder/decoder (CODEC) and amplifier 1262 that in turn may couple to output speakers 1263 which may be implemented within the chassis. Similarly, amplifier and CODEC 1262 can be coupled to receive audio inputs from a microphone 1265 which in an embodiment can be implemented via dual array microphones (such as a digital microphone array) to provide for high quality audio inputs to enable voice-activated control of various operations within the system. Note also that audio outputs can be provided from amplifier/CODEC 1262 to a headphone jack 1264. Although shown with these particular components in the embodiment of FIG. 12, understand the scope of the present disclosure is not limited in this regard.

In a particular embodiment, the digital audio codec and amplifier are capable of driving the stereo headphone jack, stereo microphone jack, an internal microphone array and stereo speakers. In different implementations, the codec can be integrated into an audio DSP or coupled via an HD audio path to a peripheral controller hub (PCH). In some implementations, in addition to integrated stereo speakers, one or more bass speakers can be provided, and the speaker solution can support DTS audio.

some embodiments, processor 1210 may be powered by an external voltage regulator (VR) and multiple internal voltage regulators that are integrated inside the processor die, referred to as fully integrated voltage regulators (FIVRs). The use of multiple FIVRs in the processor enables the grouping of components into separate power planes, such that power is regulated and supplied by the FIVR to only those components in the group. During power management, a given power plane of one FIVR may be powered down or off when the processor is placed into a certain low power state, while another power plane of another FIVR remains active, or fully powered.

In one embodiment, a sustain power plane can be used during some deep sleep states to power on the I/O pins for several I/O signals, such as the interface between the processor and a PCH, the interface with the external VR and the interface with EC 1235. This sustain power plane also powers an on-die voltage regulator that supports the onboard SRAM or other cache memory in which the processor context is stored during the sleep state. The sustain power plane is also used to power on the processor's wakeup logic that monitors and processes the various wakeup source signals.

During power management, while other power planes are powered down or off when the processor enters certain deep sleep states, the sustain power plane remains powered on to support the above-referenced components. However, this can lead to unnecessary power consumption or dissipation when those components are not needed. To this end, embodiments may provide a connected standby sleep state to maintain processor context using a dedicated power plane. In one embodiment, the connected standby sleep state facilitates processor wakeup using resources of a PCH which itself may be present in a package with the processor. In one embodiment, the connected standby sleep state facilitates sustaining processor architectural functions in the PCH until processor wakeup, this enabling turning off all of the unnecessary processor components that were previously left powered on during deep sleep states, including turning off all of the clocks. In one embodiment, the PCH contains a time stamp counter (TSC) and connected standby logic for controlling the system during the connected standby state. The integrated voltage regulator for the sustain power plane may reside on the PCH as well.

In an embodiment, during the connected standby state, an integrated voltage regulator may function as a dedicated power plane that remains powered on to support the dedicated cache memory in which the processor context is stored such as critical state variables when the processor enters the deep sleep states and connected standby state. This critical state may include state variables associated with the architectural, micro-architectural, debug state, and/or similar state variables associated with the processor.

The wakeup source signals from EC 1235 may be sent to the PCH instead of the processor during the connected standby state so that the PCH can manage the wakeup processing instead of the processor. In addition, the TSC is maintained in the PCH to facilitate sustaining processor architectural functions. Although shown with these particular components in the embodiment of FIG. 12, understand the scope of the present disclosure is not limited in this regard.

Power control in the processor can lead to enhanced power savings. For example, power can be dynamically allocate between cores, individual cores can change frequency/voltage, and multiple deep low power states can be provided to enable very low power consumption. In addition, dynamic control of the cores or independent core portions can provide for reduced power consumption by powering off components when they are not being used.

Some implementations may provide a specific power management IC (PMIC) to control platform power. Using this solution, a system may see very low (e.g., less than 5%) battery degradation over an extended duration (e.g., 16 hours) when in a given standby state, such as when in a Win8 Connected Standby state. In a Win8 idle state a battery life exceeding, e.g., 9 hours may be realized (e.g., at 150 nits). As to video playback, a long battery life can be realized, e.g., full HD video playback can occur for a minimum of 6 hours. A platform in one implementation may have an energy capacity of, e.g., 35 watt hours (Whr) for a Win8 CS using an SSD and (e.g.,) 40-44 Whr for Win8 CS using an HDD with a RST cache configuration.

A particular implementation may provide support for 15 W nominal CPU thermal design power (TDP), with a configurable CPU TDP of up to approximately 25 W TDP design point. The platform may include minimal vents owing to the thermal features described above. In addition, the platform is pillow-friendly (in that no hot air is blowing at the user). Different maximum temperature points can be realized depending on the chassis material. In one implementation of a plastic chassis (at least having to lid or base portion of plastic), the maximum operating temperature can be 52 degrees Celsius (C.). And for an implementation of a metal chassis, the maximum operating temperature can be 46° C.

In different implementations, a security module such as a TPM can be integrated into a processor or can be a discrete device such as a TPM 2.0 device. With an integrated security module, also referred to as Platform Trust Technology (PTT), BIOS/firmware can be enabled to expose certain hardware features for certain security features, including secure instructions, secure boot, Intel® Anti-Theft Technology, Intel® Identity Protection Technology, Intel® Trusted Execution Technology (TXT), and Intel® Manageability Engine Technology along with secure user interfaces such as a secure keyboard and display.

Figure 13:
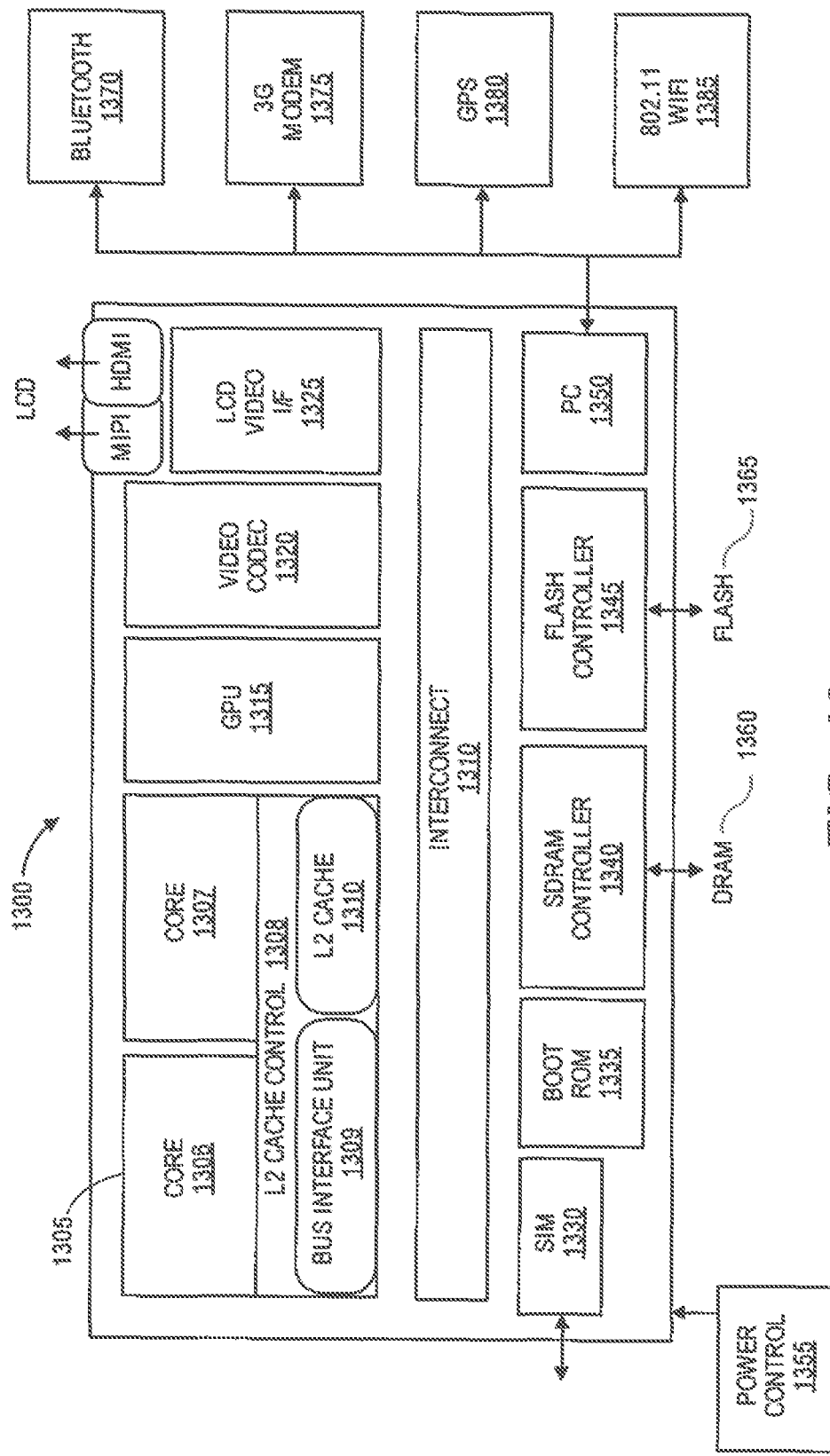
FIG. 13 is a block diagram illustrating another embodiment of a computer system.

Turning next to FIG. 13, another block diagram for an example computing system in accordance with certain embodiments is shown. As a specific illustrative example, SoC 1300 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SoC 1300 includes 2 cores—1306 and 1307. Similar to the discussion above, cores 1306 and 1307 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 1306 and 1307 are coupled to cache control 1308 that is associated with bus interface unit 1309 and L2 cache 1310 to communicate with other parts of system 1300. Interconnect 1310 includes an on-chip interconnect, such as an IOSF, AMBA, or other interconnect discussed above, which potentially implements one or more aspects of the described disclosure.

Interface 1310 provides communication channels to the other components, such as a Subscriber Identity Module (SIM) 1330 to interface with a SIM card, a boot rom 1335 to hold boot code for execution by cores 1306 and 1307 to initialize and boot SoC 1300, a SDRAM controller 1340 to interface with external memory (e.g. DRAM 1360), a flash controller 1345 to interface with non-volatile memory (e.g. Flash 1365), a peripheral control Q1650 (e.g. Serial Peripheral Interface) to interface with peripherals, video codecs 1320 and Video interface 1325 to display and receive input (e.g. touch enabled input), GPU 1315 to perform graphics related computations, etc. Any of these interfaces may incorporate aspects of the disclosure described herein.

In addition, the system illustrates peripherals for communication, such as a Bluetooth module 1370, 3G modem 1375, GPS 1380, and WiFi 1385. Note as stated above, a UE includes a radio for communication. As a result, these peripheral communication modules are not all required. However, in a UE some form of a radio for external communication is to be included.

References to "one embodiment", "an embodiment", "example embodiment", "various embodiments", etc., indicate that the embodiment(s) so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to performs acts of the method, or of an apparatus or system for facilitating hybrid communication according to embodiments and examples described herein.

Some embodiments pertain to Example 1 that includes an embedded Universal Serial Bus 2.0 (USB2) device comprising a physical layer having a detection mechanism to detect an Single-ended 1 (SE1) valid state and differentiate the SE1 valid state from other USB2 states Example 2 includes the subject matter of Example 1, wherein the detection mechanism comprises a skew detect component to operate in the presence of a clock and in a L0 power state to differentiate the SE1 valid state from a transfer state.

Example 3 includes the subject matter of Examples 1 and 2, wherein the skew detect component generates a signal to differentiate the SE1 valid state from the transfer state.

Example 4 includes the subject matter of Examples 1-3, wherein the skew detect component detection of the SE1 valid state indicates a start control message (SCM) is to be received.

Example 5 includes the subject matter of Examples 1-4, wherein the skew detect component detection of the SE1 valid state indicates an Extended SE1 (ESE1) signal is to be received.

Example 6 includes the subject matter of Examples 1-5, wherein the detection mechanism further comprises a noise detect component to operate in a clockless and powerless state to differentiate the SE1 valid state from noise coupling.

Example 7 includes the subject matter of Examples 1-6, wherein the noise detect component detection of the SE1 valid state indicates an Extended SE1 (ESE1) signal is to be received.

Example 8 includes the subject matter of Examples 1-7, wherein the noise detect component generates a signal to differentiate the SE1 valid state from the transfer state.

Example 9 includes the subject matter of Examples 1-8, wherein the noise detect component and the noise detect component each comprise a first resistor-capacitor (RC) component to a signal line and a second (RC) component to the signal line.

Example 10 includes the subject matter of Examples 1-9, wherein the first RC component has a first filter range and the second RC component has a second filter range.

Some embodiments pertain to Example 11 that includes an embedded Universal Serial Bus 2.0 (USB2) method comprising receiving a signal indicating a Single-ended 1 (SE1) valid state on a communication link and detecting whether the signal indicates the SE1 valid state or another USB2 state.

Example 12 includes the subject matter of Example 11, wherein detecting whether the signal indicates the SE1 valid state or another USB2 state comprises detecting the SE1 valid state upon determining that a first detect signal has been activated.

Example 13 includes the subject matter of Examples 11 and 12, wherein detection of the SE1 valid state indicates of a start control message (SCM) is to be received.

Example 14 includes the subject matter of Examples 11-13, wherein detection of the SE1 valid state indicates an Extended SE1 (ESE1) signal is to be received.

Example 15 includes the subject matter of Examples 11-14, further comprising determining whether the communication link is operating in a L0 power state.

Example 16 includes the subject matter of Examples 11-15, further comprising activating a first detection component to detect the first detect signal upon a determination that the communication link is operating in the L0 power state.

Example 17 includes the subject matter of Examples 11-16, further comprising activating the first detection component to detect the first detect signal upon a determination that the communication link is not operating in the L0 power state and activating a second detection component to detect a second detect signal.

Example 18 includes the subject matter of Examples 11-17, further comprising determining whether the first detect signal has been detected by the first detection component and the second detect signal has been detected by the second detection component and detecting the SE1 valid state upon determining that first detect signal has been detected by the first detection component and the second detect signal has been detected by the second detection component.

Example 19 includes the subject matter of Examples 11-18, further comprising activating a clock system upon detecting the SE1 valid state and activating a power supply.

Example 20 includes the subject matter of Examples 11-19, wherein detection of the SE1 valid state indicates an Extended SE1 (ESE1) signal is to be received.

Some embodiments pertain to Example 21 that includes an embedded Universal Serial Bus 2.0 (USB2) host comprising a host port comprising a physical layer to detect a Single-ended 1 (SE1) valid state and differentiate the SE1 valid state from other USB2 states.

Example 22 includes the subject matter of Example 21, further comprising a first detect component to operate in the presence of a clock and in a L0 power state to differentiate the SE1 valid state from a transfer state and a second detect component to operate in a clockless and powerless state to differentiate the SE1 valid state from noise coupling.

Example 23 includes the subject matter of Examples 21 and 22, wherein the first component detection of the SE1 valid state indicates a start control message (SCM) or an Extended SE1 (ESE1) signal is to be received.

Example 24 includes the subject matter of Examples 21-23, wherein the second component detection of the SE1 valid state indicates an Extended SE1 (ESE1) signal is to be received.

Example 25 includes the subject matter of Examples 21-24, further comprising a first resistor-capacitor (RC) component to a signal line and a second (RC) component to the signal line.

Although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. An Embedded Universal Serial Bus 2.0 (eUSB2) device, comprising:
a physical layer having a detection mechanism to detect a Single-ended 1 (SE1) valid state and differentiate the SE1 valid state from other USB2 states, wherein the detection mechanism comprises a skew detect component comprising a first gate having a first input coupled to a first signal line to receive a first signal and a second input coupled to a second signal line; and a first resistor-capacitor component coupled to the second input, wherein the first resistor-capacitor component is configured to delay a second signal on the second signal line relative to the first signal.

2. The device of claim 1, wherein the skew detect component is to operate in the presence of a clock and in a L0 power state to differentiate the SE1 valid state from a transfer state.

3. The device of claim 2, wherein the skew detect component generates a signal to differentiate the SE1 valid state from the transfer state.

4. The device of claim 2, wherein the skew detect component detection of the SE1 valid state indicates a start control message (SCM) is to be received.

5. The device of claim 2, wherein the skew detect component detection of the SE1 valid state indicates an Extended SE1 (ESE1) signal is to be received.

6. The device of claim 3, wherein the detection mechanism further comprises a noise detect component to operate in a clockless and powerless state to differentiate the SE1 valid state from noise coupling.

7. The device of claim 6, wherein the noise detect component detection of the SE1 valid state indicates an Extended SE1 (ESE1) signal is to be received.

8. The device of claim 7, wherein the noise detect component generates a signal to differentiate the SE1 valid state from the transfer state.

9. The device of claim 1, wherein the skew detect component comprises:
a second gate having a third input coupled to the first signal line and a fourth input coupled to the second signal line; and
a second resistor-capacitor (RC) component to delay the second signal relative to the first signal.

10. The device of claim 9, wherein the first RC component has a first filter range to provide a first delay and the second RC component has a second filter range to provide a second delay that is different from the first delay.

11. An Embedded Universal Serial Bus 2.0 (eUSB2) method, comprising:
receiving a signal indicating a Single-ended 1 (SE1) valid state on a communication link; and
detecting whether the signal indicates the SE1 valid state or another USB2 state using a first detection component that comprises a first gate having a first input coupled to a first signal line to receive a first signal and a second input coupled to a second signal line: and a first resistor-capacitor component coupled to the second input, wherein the first resistor-capacitor component is configured to delay a second signal on the second signal line relative to the first signal.

12. The method of claim 11, wherein detecting whether the signal indicates the SE1 valid state or another USB2 state comprises detecting the SE1 valid state upon determining that a first detect signal has been activated.

13. The method of claim 11, wherein detection of the SE1 valid state indicates of a start control message (SCM) is to be received.

14. The method of claim 11, wherein detection of the SE1 valid state indicates an Extended SE1 (ESE1) signal is to be received.

15. The method of claim 11, further comprising determining whether the communication link is operating in a L0 power state.

16. The method of claim 15, further comprising activating the first detection component to detect the first detect signal upon a determination that the communication link is operating in the L0 power state.

17. The method of claim 15, further comprising:
activating the first detection component to detect the first detect signal upon a determination that the communication link is not operating in the L0 power state; and
activating a second detection component to detect a second detect signal.

18. The method of claim 17, further comprising:
determining whether the first detect signal has been detected by the first detection component and the second detect signal has been detected by the second detection component; and
detecting the SE1 valid state upon determining that first detect signal has been detected by the first detection component and the second detect signal has been detected by the second detection component.

19. The method of claim 18, further comprising:
activating a clock system upon detecting the SE1 valid state; and
activating a power supply.

20. The method of claim 19, wherein detection of the SE1 valid state indicates an Extended SE1 (ESE1) signal is to be received.

21. An Embedded Universal Serial Bus 2.0 (eUSB2) host, comprising:
a host port comprising a physical layer to detect a Single-ended 1 (SE1) valid state and differentiate the SE1 valid state from other USB2 states, wherein the physical layer comprises a first detect component comprising a first gate having a first input coupled to a first signal line to receive a first signal and a second input coupled to a second signal line; and a first resistor-capacitor component coupled to the second input, wherein the first resistor-capacitor component is configured to delay a second signal on the second signal line relative to the first signal.

22. The host of claim 21, wherein
the first detect component is configured to operate in the presence of a clock and in a L0 power state to differentiate the SE1 valid state from a transfer state; and
wherein the physical layer comprises a second detect component to operate in a clockless and powerless state to differentiate the SE1 valid state from noise coupling.

23. The host of claim 22, wherein the first component detection of the SE1 valid state indicates a start control message (SCM) or an Extended SE1 (ESE1) signal is to be received.

24. The host of claim 22, wherein the second component detection of the SE1 valid state indicates an Extended SE1 (ESE1) signal is to be received.

25. The host of claim 21, wherein the first detect component comprises:
a second gate having a third input coupled to the first signal line and a fourth input coupled to the second signal line; and
a second (RC) component to delay the second signal relative to the first the signal.

* * * * *